18 June 11, 1974

3,816,540
PREPARATION OF HYDRO-PEROXIDES BY AUTOXIDATION

Bruno J. Barone and Stone D. Cooley, Houston, Tex., assignors to Petro-Tex Chemical Corporation, Houston, Texas
No Drawing. Filed May 24, 1971, Ser. No. 146,453
Int. Cl. C07c 73/06
U.S. Cl. 260—610 B    16 Claims

ABSTRACT OF THE DISCLOSURE

In autoxidation of tertiary, aryl or cycloalkanes the selectivity for organic hydroperoxides can be substantially increased by using selected polyphosphate compounds as catalyst. For example an autoxidation of isopentane with .05 wt. percent Mg pyrophosphate at 11.1 mole percent conversion gave selectivities of t-amyl hydroperoxides—74.0 mole percent acetone—14.2 mole percent and t-amyl alcohol—5.6 mole percent. The same reaction without the catalyst at 10.3 mole percent conversion gave selectivities of t-amyl hydroperoxide—30.6 mole percent acetone—51.2 mole percent and t-amyl alcohol—14.9 mole percent.

BACKGROUND OF THE INVENTION

The present invention relates to the preparation of the hydroperoxides of tertiary alkanes, aralkanes and cycloalkanes. More particularly it relates to the autoxidation of tertiary alkanes, aralkanes and cycloalkanes in the presence of selected polyphosphate compounds. The term autoxidation is understood to mean the reaction of a substance with molecular oxygen without the intervention of a flame. The hydroperoxides of tertiary, aryl and cycloalkanes have been prepared by autoxidation. Generally the results of these preparations have been rather discouraging. Two comprehensive reviews of the prior art of perioxides are "Organic Peroxides, Their Formation and Reactions," E. G. E. Hawkins, D. Van Nostrand Company, Inc., Princeton, N.J., 1961, and "Organic Peroxides, A. G. Davies, Butterworths, London, 1961, which are incorporated herein insofar as they describe the prior art.

Most known autoxidation reactions for the tertiary, aryl and cycloalkanes have relatively low selectivities for the hydroperoxides. Generally, the product of such oxidations has been a mixture of oxidation products, e.g., the aldehydes, ketones, alcohols, acids, hydroperoxides, water and carbondioxide. If the desired product is a hydroperoxide then the production of such by-products and the necessity of removing some or all of them from the hydroperoxide makes an economically unattractive process. A preferable process would be one that had high selectivity for the hydroperoxide with few and relatively low concentrations of by-products. Such a process would be attractive even if low conversions were necessitated, since the hydrocarbon starting material makes an excellent diluent for the potentially dangerous hydroperoxide. Very often a product such as that described above can be used directly or with a minimum of treatment for the purification and concentration of the hydroperoxide.

It is an object of this invention to provide an improved process for the autoxidation of tertiary alkanes, aralkanes and cycloalkanes to produce hydroperoxides. It is a further object to provide a process which has high selectivity for hydroperoxides. These and other objects will become apparent from the discussion below.

SUMMARY OF THE INVENTION

It has been found that organic hydroperoxides can be obtained by a process comprising contacting a tertiary alkane, aralkane or cycloalkane with molecular oxygen in liquid phase in the presence of a polyphosphate compound of a metal selected from the group consisting of Sn, Cu, Na, Mg, Ca and mixtures thereof. The term polyphosphates as used herein refers not only to the corresponding salts of the various polyphosphoric acids, e.g., pyrophosphoric acid, triphosphoric acid, tetraphosphoric acid and the like, but also to the corresponding salts of the polymetaphosphoric acids, e.g., dimetaphosphoric acid, trimetaphosphoric acid, tetrametaphosphoric acid, pentametaphosphoric acid, hexametaphosphoric acid and the like. A preferred group consists of Sn and Cu. Some specific polyphosphates that illustrate the catalyst for the system are sodium pyrophosphate, magnesium pyrophosphate, calcium pyrophosphate, stannous pyrophosphate, cupric pyrophosphate, sodium tripolyphosphate, sodium hexametaphosphate, magnesium penteohexaphosphate, calcium hepterohexaphosphate, copper dimetaphosphate and the like.

It is theorized, without intending any limitation to the scope of the present invention, that the function of the polyphosphate compound is at least two-fold in the reaction. First, the metal salts serve to absorb any metal ions in the reaction medium thus reducing the possibility of further oxidation which may be catalyzed by such stray ions and secondly in a similar manner the polyphosphate absorbs acids that are formed, reducing the possibility of side reaction acid catalysis.

The polyphosphate compound can be of some value in concentrations as low as 0.025 weight percent based on hydrocarbon feed. Excellent results have been obtained in the range of 0.03 to 0.2 weight percent based on the hydrocarbon feed. Generally no more than 0.5 weight percent of the polyphosphate would be employed and preferably 0.2 or less weight percent. It has been observed that there is a decrease in the selectivity of the reaction for hydroperoxides as the conversion is increased in the presence of a given amount of catalyst. The effect on hydroperoxide selectivity can be somewhat mitigated by the use of additional quantities of polyphosphate within the specified ranges. Within the specified ranges one skilled in the art will be able to select the quantity of polyphosphate for a desired product distribution at a desired economic cost and ease of operation.

The process of the present invention is used for the preparation of hydroperoxides from tertiary alkanes, aralkanes and cycloalkanes. Suitably, the tertiary alkanes and cycloalkanes would have from 3 to 30 carbon atoms, preferably 4 to 10 and most preferably 5 to 8 carbon atoms. The carbons on the tertiary carbon atoms may be primary, secondary or tertiary, thus there may be more than one tertiary carbon atom in a compound. Some examples of tertiary alkanes intended to be included are isobutane, isopentane, 2-methyl pentane, 3-methyl hexane, 2,3-dimethyl hexane, 4-methyl heptane, 2-n-propyl heptane, 3-tertiary butyl-hexane, 2-methyl decane, 2,6-dimethyl-3-isopropyl heptane, 2,11-dimethyl dodecane, 2-methylheptadecane, 7-isopropylhexadecane, 4 - n - propyl-nonadecane, 10-n-nonyl-n-nonadecane and the like. The cycloalkane may be mono, di or tri cyclo, etc. unsubstituted or substituted with hydrocarbons. The hydrocarbon substituent will usually contain 1 to 10 carbon atoms and may be branched or unbranched. Suitable cycloalkanes include for example cyclopropane, propylcyclopropane, 1-methyl-2(2-methyl propyl) cyclopropyl, cyclobutane, 1,2-dimethyl-cyclobutane, 1,2-diisopropylcyclobutane, cyclopentane, ethyl cyclopentane, cyclohexane, 1,2,4-trimethyl cyclohexane, propylcycloheptane, cyclooctane, methylcyclooctane, cycloundecane, cyclododecane, cyclooctadecane, cyclotriacontane, cyclopentylcyclopentane, cyclopentylcyclohexylmethane, bicyclohexane, [0,3,3] bicyclooctane, perhydrophenanthrene, 1,3-dimethyl 7 - isopropyl-2,3-(3-methylcyclohexano)-[0,4,4]-bicyclodecane and the like.

The aralkane will generally have one or two aromatic groups and includes, for example, ethylbenzene, cumene, 2-ethyl naphthalene, o-cymene, 2-ethyl-6-methyl naphthalene and the like. A particularly preferred group of hydrocarbons for the use in the present process are isobutane, isopentane, isohexane, isoheptane, isooctane, ethylbenzene, cumene, cyclopentane, cyclohexane and cycloheptane.

As stated above the tertiary alkane may contain secondary and other tertiary groups, likewise the aralkane and the cycloalkane can contain various hydrocarbon substituents as well as more than one cyclic structure. Such highly branched and substituted hydrocarbons are generally suitable for the present process, however, it should be borne in mind that presence of more than one tertiary group on the tertiary alkane or the aralkane, or the presence of alkyl substituents, particularly tertiary substitutents on the cycloalkane, can result in a great profusion of products since the number of principal active sites is increased in each substitution. This is not to say that all of the sites, even of the same or similar grouping, will possess the same degree of activity. Other factors such as the electron density, steric and kinetic considerations, and the like, may for the most part control such activity. In any event, it should be expected that use of exotic or complex hydrocarbon starting materials will probably give lower selectivities to the desired hydroperoxides. In the present examples, such complicating reactions are largely avoided by the use of a relatively simple tertiary alkane, i.e., isopentane, which will demonstrate the type of reaction and the advantages that can arise from the present process.

The reactions of the present process result in hydroperoxides corresponding to the starting hydrocarbon. Since the tertiary carbon is the most reactive in the autoxidation, the product is almost entirely the tertiary hydroperoxide. The secondary carbon atoms in unsubstituted cycloalkanes are similar to the tertiary groups and react accordingly; however, a tertiary carbon is the preferred reaction site in the substituted cycloalkanes. The following examples will demonstrate the reaction: Isobutane to tertiary-butyl hydroperoxide, isopentane to tertiary-amyl hydroperoxide, isohexane to tertiary-hexyl hydroperoxide, ethyl benzene to α-phenyl ethyl hydroperoxide, cyclopentane to cyclopentyl hydroperoxide, Decalin to Decalin-4'-hydroperoxide.

The present reaction is an autoxidation carried out at somewhat elevated temperatures. Generally the temperatures which are most suitable for the oxidation will be between about 130–160° C. and more preferably about 140–150° C. In autoxidations there is usually an induction period during which the reaction proceeds very slowly. During this period the production of hydroperoxide is slow, however, when a sufficient concentration of hydroperoxide is achieved the reaction is initiated at its "real" reaction rate. The induction period can be reduced by the use of high initial temperatures, i.e., 160–170° C. which will allow the rapid buildup of hydroperoxide. However, once the reaction is initiated the temperature is reduced, e.g., 140–150° C. Temperatures higher than 160° C. should not be employed after the reaction has been initiated since the possibility of further oxidation of the peroxide is enhanced.

The induction period mentioned above can also be reduced by the addition of an initiator such as some of the hydroperoxide product to be produced. Other initiators are free radical initiators such as α-methyl benzyl hydroperoxide, α-methyl - p - methylbenzenyl hydroperoxide, α-methyl-α'-n-propyl-p-xylylene dihydroperoxide, ethyl acetoacetate, phenylacetone, acetylacetone and the like.

The autoxidation is carried out by contacting the tertiary alkane in liquid phase at the temperatures and conditions set out herein with molecular oxygen. The oxygen can be furnished as pure oxygen or in gases containing oxygen, e.g., air or mixtures of oxygen with inert gases, such as helium or nitrogen in the same or substantially different proportions as oxygen is found in air.

Sufficient pressure is employed so as to maintain the reaction mixture in liquid phase. This will usually require more than atmospheric pressure, although some of the hydrocarbons encompassed herein are liquid at atmospheric pressure at temperatures up to 170° C. Generally, however, pressure will be required. It is not necessary to use any more pressure than is necessary to maintain the liquid phase since oxygen is not believed to be the rate determining factor in the reaction. Pressures of atmospheric up to about 1000 p.s.i. will usually be sufficient.

Diluents can be used, for example, benzene, toluene, xylene, naphthalene, tert-butyl alcohol, tert-amyl alcohol, nitrobenzene, carbon tetrachloride, and the like. It should be noted that such diluent will decrease the rate of reaction. Generally, the unreacted feed material will be a sufficient diluent for this reaction. The usual metal oxidation catalyst should not be present during the present reaction and any solvent should be examined to be sure it is free of such contaminants.

In carrying out the process it has been found that the best results are obtained when the polyphosphate compound is thoroughly dispersed in the reaction medium. This is best achieved by agitation of the reaction medium for example, by high speed stirring. An aid to maintaining the dispersion would be the use of very fine powders such as below about 20 micron size. The polyphosphate compound is easily recovered since it is a solid in the reaction system. The presence of residual phosphate in the product is not, however, detrimental, but is advantageous in that the polyphosphates stabilize hydroperoxides.

The following examples will illustrate the operation of the invention and the advantages to be derived therefrom. The apparatus used in each of the following examples was a 3,000 p.s.i. magnetically stirred, 1.4 liter, stainless steel autoclave, equipped with a Dispersamax agitator, reflux condenser and internal water cooling coil. The isopentane feed and other materials for the reaction were charged to the reactor. Oxygen containing gas was added continuously with sufficient pressure to maintain the liquid phase. Inlet gas was measured by following the pressure drop in a standardized metering vessel and fed into the autoclave through a ballast type pressure regulator. Exit gas, at atmospheric pressure, was then passed through three Dry Ice traps, an ascarite trap, a wet test meter and then vented. Pure oxygen was employed in the present examples unless otherwise indicated.

EXAMPLES 1–6

These Examples show the effect of the preferred group of tin and copper polyphosphates on the oxidation. Example 1 is a control. The reactants, proportions, conditions and results are set out in Table I.

TABLE 1.—OXIDATION OF ISOPENTANE UNDER 600 P.S.I. OXYGEN PRESSURE

| Example number | 1* | 2 | 3 | 4 | 5 | 6 |
|---|---|---|---|---|---|---|
| Reactants: | | | | | | |
| Isopentane, g | 600 | 600 | 600 | 600 | 600 | 600 |
| Stannous pyrophosphate, g | | 0.3 | 0.3 | 0.3 | | |
| Cupric pyrophosphate, g | | | | | 0.3 | 0.3 |
| Reaction conditions: | | | | | | |
| Temperature, °C | 140 | 140 | 140 | 140 | 640 | 150 |
| Total reaction time, hrs | 4.17 | 7.50 | 11.3 | 3.8 | 4.67 | 3.50 |
| Results: | | | | | | |
| Induction period, min | 176 | 210 | 404 | 104 | 110 | 126 |
| Oxygen consumed, mole | 1.098 | 0.867 | 1.056 | 0.942 | 0.950 | 1.137 |
| Carbon dioxide produced, mole | 0.020 | 0.013 | 0.013 | 0.011 | 0.003 | 0.001 |
| Hydroperoxide concentration, wt. percent | 7.98 | 10.29 | 10.18 | 9.63 | 5.68 | 8.03 |
| Isopentane conversion, percent | 10.0 | 9.6 | 8.5 | 9.1 | 4.8 | 9.9 |
| Percent selectivity (mole product/500 mole hydrocarbon consumed): | | | | | | |
| Acetone | 31.2 | 16.7 | 9.6 | 15.9 | 13.3 | 22.8 |
| Tertiary amyl alcohol | 4.8 | 2.3 | 0.7 | 4.2 | 1.0 | 13.1 |
| Tertiary amyl hydroperoxide | 56.8 | 76.1 | 84.8 | 74.8 | 83.7 | 58.7 |

*Control.

EXAMPLES 7-13

These Examples show the catalyst of Na, Mg and Ca salts. Each catalyst provides some improvement over the uncatalyzed control (Ex. 1). It can be seen that these catalysts are quite temperature sensitive and exhibit a narrow range of suitability in that regard. The conditions, reactants, proportions and results are shown in Table II.

TABLE II.—OXIDATION OF ISOPENTANE UNDER 600 P.S.I OXYGEN PRESSURE

| Example number | *1 | 7 | 8 | 9 | 10 | 11 | 12 |
|---|---|---|---|---|---|---|---|
| Reactants: | | | | | | | |
| Isopentane, g | 600 | 600 | 600 | 600 | 600 | 600 | 600 |
| Sodium pyrophosphate, g | | 0.3 | 0.3 | | | | |
| Magnesium pyrophosphate, g | | | | 0.3 | 0.3 | | |
| Calcium pyrophosphate, g | | | | | | 0.3 | 0.3 |
| Reaction Conditions: | | | | | | | |
| Temperature, °C | 140 | 140 | 150 | 140 | 150 | 140 | 150 |
| Total reaction time, hrs | 4.17 | 5.33 | 2.58 | 7.53 | 2.0 | 5.0 | 3.07 |
| Results: | | | | | | | |
| Induction period, min | 176 | (a) | 84 | 254 | 75 | (a) | 135 |
| Oxygen consumed, mole | 1.098 | | 0.932 | 0.936 | 0.964 | | 0.936 |
| Carbon dioxide produced, mole | 0.020 | | 0.019 | 0.021 | 0.028 | | 0.023 |
| Hydroperoxide concentration, wt. percent | 7.98 | | 9.05 | 11.60 | 7.48 | | 8.05 |
| Isopentane conversion, percent | 10.0 | | 8.8 | 11.1 | 9.2 | | 9.3 |
| Percent selectivity (mole product/100 mole hydrocarbon consumed): | | | | | | | |
| Acetone | 31.2 | | 25.7 | 14.2 | 32.4 | | 27.7 |
| Tertiary amyl alcohol | 4.8 | | 0.3 | 5.6 | 3.9 | | 8.9 |
| Tertiary amyl hydroperoxide | 56.8 | | 72.3 | 74.0 | 57.5 | | 60.0 | a No reaction.
*Control.

EXAMPLES 13-18

These Examples show some other polyphosphates as catalyst at various concentrations. The reaction conditions, reactants, quantities and results are in Table III.

TABLE III.—OXIDATION OF ISOPENTANE UNDER PURE OXYGEN PRESSURE

| Example number | 13 | 14 | 15 | 16 | 17 |
|---|---|---|---|---|---|
| Reactants: | | | | | |
| Isopentane, g | 100 | 600 | 600 | 100 | 600 |
| Sodium tripolyphosphate, g | 0.2 | 0.6 | 0.3 | | |
| Sodium hexametaphosphate, g | | | | 0.2 | 0.3 |
| Reaction conditions: | | | | | |
| Temperature, °C | 150 | 150 | 150 | 150 | 150 |
| Pressure, p.s.i | 500 | 600 | 600 | 500 | 600 |
| Total reaction time, hrs | 4.58 | 4.53 | 3.83 | 4.13 | 4.17 |
| Results: | | | | | |
| Induction period, min | 151 | 160 | 209 | 135 | 150 |
| Oxygen consumed, mole | 0.257 | 0.790 | 0.865 | 0.239 | 0.992 |
| Carbon dioxide produced, mole | 0.001 | 0.015 | 0.012 | 0.003 | 0.018 |
| Hydroperoxide concentration, wt. percent | 15.59 | 10.15 | 10.22 | 12.73 | 10.81 |
| Isopentane consumed, percent | 17.1 | 8.8 | 8.9 | 12.4 | 9.6 |
| Percent selectivity (mole product/100 mole hydrocarbon consumed): | | | | | |
| Acetone | 24.9 | 13.9 | 15.5 | 21.5 | 16.0 |
| t-Amyl alcohol | 4.6 | 1.5 | 0.5 | 0.5 | 1.4 |
| t-Amyl hydroperoxide | 65.9 | 80.8 | 80.6 | 73.1 | 79.5 |

EXAMPLES 12

These Examples demonstrate the detrimental effect of excessive catalyst. The reaction data is set out in Table IV.

TABLE IV.—OXIDATION OF ISOPENTANE UNDER 500 P.S.I. OXYGEN PRESSURE

| Example number | 18 | 19 | 20 | 21 | 22 |
|---|---|---|---|---|---|
| Reactants: | | | | | |
| Isopentane, g | 100 | 100 | 100 | 100 | 100 |
| Sodium tripolyphosphate, g | 2.0 | 1.0 | 0.5 | | |
| Sodium hexa meta phosphate, | | | | 1.0 | 0.5 |
| Reaction conditions: | | | | | |
| Temperature, °C | 140 | 140 | 140 | 140 | 140 |
| Total reaction time, hrs | 5.0 | 3.17 | 7.5 | 4.08 | 6.83 |
| Results: | | | | | |
| Induction period, min | 108 | 24 | 190 | 79 | 154 |
| Oxygen consumed, mole | 0.275 | 0.200 | 0.223 | 0.241 | 0.228 |
| Carbon dioxide produced, mole | 0.006 | 0.008 | 0.008 | 0.009 | 0.009 |
| Hydroperoxide concentration, wt. percent | 11.83 | 11.76 | 15.49 | 14.80 | 14.22 |
| Isopentane conversion, percent | 15.6 | 14.0 | 17.4 | 21.0 | 16.3 |
| Selectivity (mole product;100 mole hydrocarbon consumed): | | | | | |
| Acetone | 29.7 | 22.9 | 21.3 | 26.6 | 21.7 |
| t-Amyl alcohol | 12.7 | 11.9 | 8.5 | 17.6 | 9.9 |
| t-Amyl hydroperoxide | 55.0 | 59.6 | 64.4 | 50.0 | 61.6 |

The detrimental effect of the excessive catalysts is more pronounced if one considers Example 16 which employed only 0.05 wt. percent sodium tripolyphosphate and gave an 80.6% selectivity to hydroperoxide with only 15.5% acetone and Examples 19 and 20.

The invention claimed is:

1. A process for preparing organic hydroperoxides at high selectivities of hydroperoxide comprising contacting a compound selected from at least one of the group consisting of isobutane, isopentane, isohexane, isoheptane, isooctane, ethylbenzene, cumene, cyclopentane, cyclohexane, cycloheptane, cyclooctane and cyclooctadecane with molecular oxygen in liquid phase at a pressure from about atmospheric up to about 1000 p.s.i. and at a temperature from about 130 to 160° C. in the presence of polyphosphate salt of an element selected from the group consisting of Sn and Cu, the said polyphosphate salt being present in an amount of 0.025 to 0.2 weight percent based on the hydrocarbon feed.

2. The process according to claim 1 wherein the temperature is betweeen 140–150° C.

3. The process according to claim 2 wherein the pressure is sufficient to maintain the liquid phase.

4. The process according to claim 3 wherein there is about 0.03 to 0.2 weight percent of the polyphosphate present.

5. The process according to claim 4 wherein said compound is selected from the group consisting of isobutane, isopentane, isohexane, isoheptane, isooctane, ethylbenzene, cumene, cyclopentane, cyclohexane and cycloheptane.

6. The process according to claim 5 wherein the metal is Sn.

7. The process according to claim 5 wherein the metal is Cu.

8. The process according to claim 5 wherein the tertiary alkane is isopentane and the hydroperoxide is tertiary amyl hydroxide.

9. The process according to claim 8 wherein the metal compound is stannous pyrophosphate or cupric pyrophosphate.

10. The process according to claim 9 wherein the metal compound is stannous pyrophosphate.

11. The process according to claim 9 wherein the metal compound is cupric pyrophosphate.

12. A process for the preparation of tertiary amyl hydroperoxide comprising contacting in the liquid phase at a pressure of from about atmospheric to 1000 p.s.i. and at a temperature of from about 130 to 160° C. isopentane with molecular oxygen in the presence of from 0.030 to 0.2 percent by weight of a polyphosphate of a metal selected from the group consisting of Sn and Cu.

13. The process according to claim 12 wherein the metal is Sn.

14. The process according to claim 12 wherein the metal is Cu.

15. The process according to claim 12 wherein the polyphosphate is stannous pyrophosphate or cupric pyrophosphate.

16. The process according to claim 12 wherein the pyrophosphate is cupric pyrophosphate.

References Cited

UNITED STATES PATENTS

| | | | |
|---|---|---|---|
| 2,776,322 | 1/1957 | Webster | 260—610 B |
| 2,796,439 | 6/1957 | Berneis | 260—610 B |
| 2,798,096 | 7/1957 | Baumgartner | 260—610 B |
| 3,187,055 | 6/1965 | Armstrong | 260—610 B |
| 3,387,036 | 6/1968 | Bonnart et al. | 260—10 B |
| 1,924,786 | 8/1933 | Hartmann et al. | 260—610 B |
| 2,655,545 | 10/1953 | Bruning et al. | 260—610 B |
| 2,749,368 | 6/1956 | Fortuin et al. | 260—610 B |
| 2,820,832 | 1/1958 | Berneis | 260—610 B |

FOREIGN PATENTS

| | | | |
|---|---|---|---|
| 1,263,003 | 3/1968 | Germany | 260—610 B |
| 44/8,492 | 4/1969 | Japan | 260—610 B |

BERNARD HELFIN, Primary Examiner

W. B. LONE, Assistant Examiner

U.S. Cl. X.R.

260—597 R, 632 C

PO-1050
(5/69)

UNITED STATES PATENT OFFICE
CERTIFICATE OF CORRECTION

Patent No. 3,816,540        Dated June 11, 1974

Inventor(s) Bruno J. Barone et al

It is certified that error appears in the above-identified patent and that said Letters Patent are hereby corrected as shown below:

Col. 4, line 63 (across from "Temperature, °C", under column headed "5"), reads "640" but should read --- 140 ---.
Col. 4, line 70 reads "(Mole Product/500 Mole ...)" but should read --- (Mole Product/100 Mole ...) ---.
Col. 5, line 59, (Table III, under Ex. 15, across from "Induction Period, min.) reads "209" but should read --- 109 ---.
Col. 5, line 71 reads "Examples 12" but should read --- Examples 18 - 22
Col. 6, line 13 reads "(Mole product; 100 mole ...)" but should read --- (Mole product/ 100 Mole ...) ---.

Signed and sealed this 1st day of April 1975.

(SEAL)
Attest:

RUTH C. MASON
Attesting Officer

C. MARSHALL DANN
Commissioner of Patents
and Trademarks